(12) United States Patent
Raake et al.

(10) Patent No.: US 8,531,531 B2
(45) Date of Patent: Sep. 10, 2013

(54) AUDIO-VISUAL QUALITY ESTIMATION

(75) Inventors: Alexander Raake, Berlin (DE);
Marie-Neige Garcia, Berlin (DE);
Sebastian Moeller, Berlin (DE)

(73) Assignee: Deutsche Telekom AG, Bonn (DE)

( * ) Notice: Subject to any disclaimer, the term of this patent is extended or adjusted under 35 U.S.C. 154(b) by 566 days.

(21) Appl. No.: 12/413,815

(22) Filed: Mar. 30, 2009

(65) Prior Publication Data
US 2009/0244289 A1 Oct. 1, 2009

(30) Foreign Application Priority Data
Mar. 28, 2008 (EP) .................................... 08153548

(51) Int. Cl.
*H04N 17/00* (2006.01)
(52) U.S. Cl.
USPC .......................................... 348/192; 348/180
(58) Field of Classification Search
USPC .................. 348/192, 180; 714/712; 702/69; 375/224, 240.27; 370/252; 382/190, 207
See application file for complete search history.

(56) References Cited

U.S. PATENT DOCUMENTS

| | | | |
|---|---|---|---|
| 5,446,492 A | 8/1995 | Wolf et al. | |
| 5,596,364 A | 1/1997 | Wolf et al. | |
| 6,512,538 B1* | 1/2003 | Hollier | 348/192 |
| 7,015,947 B1* | 3/2006 | Hollier | 348/180 |
| 7,197,452 B2 | 3/2007 | Hands | |
| 2003/0219070 A1* | 11/2003 | Turaga et al. | 375/240.03 |
| 2005/0281333 A1* | 12/2005 | Ghanbari | 375/240.16 |
| 2007/0053303 A1* | 3/2007 | Kryuchkov | 370/250 |
| 2007/0161351 A1* | 7/2007 | Lee et al. | 455/69 |
| 2007/0280129 A1* | 12/2007 | Jia et al. | 370/252 |
| 2009/0096874 A1* | 4/2009 | Hayashi et al. | 348/192 |
| 2009/0201824 A1* | 8/2009 | Leung et al. | 370/252 |

FOREIGN PATENT DOCUMENTS

| | | |
|---|---|---|
| DE | 102005040301 A1 | 3/2007 |
| EP | 0869684 A2 | 10/1998 |
| EP | 1244312 A1 | 9/2002 |
| EP | 1530200 A1 | 5/2005 |
| JP | 8289333 A | 11/1996 |
| JP | 2005244321 A | 9/2005 |
| JP | 2006074333 A | 3/2006 |
| JP | 2006324865 A | 11/2006 |
| WO | 0001165 A1 | 1/2000 |
| WO | WO 2004054274 A1 | 6/2004 |

OTHER PUBLICATIONS

Opinion Model for Audio-Visual Communication Quality From Quality Parameters by Coding and Packet Loss by Arayama Yusuke et al., pp. 57-60 ICICE Technical Report, Nov. 2005.*

(Continued)

*Primary Examiner* — Victor Kostak
(74) *Attorney, Agent, or Firm* — Leydig, Voit & Mayer, Ltd.

(57) ABSTRACT

A method and an apparatus for estimating a quality of an audio-video signal includes calculating audio and video quality factors from audio and video technical characteristics. An audio-video quality factors interaction is computed from an interaction between the audio and video quality factors. At least one of an audio quality, a video quality and an audio-visual quality is computed using the audio and video quality factors and the audio-video quality factors interaction.

15 Claims, 5 Drawing Sheets

Audio-Visual Quality estimation method and measurement system

(56) References Cited

OTHER PUBLICATIONS

Arayama, et al, 2005. "Opinion model for audio-visual communication quality from quality parameters by coding and packet loss." Denshi Joho Tsushin Gakkai Gijutsu Kunkyu Hokoku—IEICE Technical Report 105(406): 58-60.*

Beerends, et al, 1999. "The Influence of Video Quality on Perceived Audio Quality and Vice Versa." J. Audio Eng. Soc. 47(5): 355-362.

Shumeli, et al, 2004. "Effects of frame rate, frame size and MPEG2 compression on the perceived compressed video quality transmitted over lossy IP networks." 2nd International Conference on Information Technology: Research and Education, London, UK, pp. 49-54.

Search Report for European Patent Application Serial No. 09004474.4. Mail date Aug. 17, 2009.

ITU-T Rec. G.107, 1995-2005, pp. 1-25.

ITU J.144, 2004, pp. 1-156.

ITU-T Rec. P.862 "PESQ", 2001, pp. 1-30.

Heute et al. "Integral and Diagnostic Speech-Quality Measurement: State of the Art, Problems, and New Approaches", in: Proc. 4th European Congress on Acoustics (Forum Acusticum 2005), HU-Budapest, pp. 1695-1700.

ITU-T P.800, 1996, pp. 1-37.

ITU-T P.910, 1999, pp. 1-37.

Chateau, Study of the Influence of Experimental Context on the Relationship Between Audio, Video and Audiovisual Subjective Qualities, Sep. 18, 1998, pp. 1-17, International Telecommunication Union, Telecommunication Standardization Sector.

Raake, et al., IP-Based Mobile and Fixed Network Audiovisual Media Services, IEEE Signal Processing Magazine, Nov. 1, 2011, pp. 68-79, Ingram Publishing.

Takahashi et al., Standardization Activities in the ITU for a QOE Assessment of IPTV, IEEE Communications Magazine, Feb. 2008, pp. 78-84.

* cited by examiner

FIG. 2: Audio-Visual Quality estimation method and measurement system

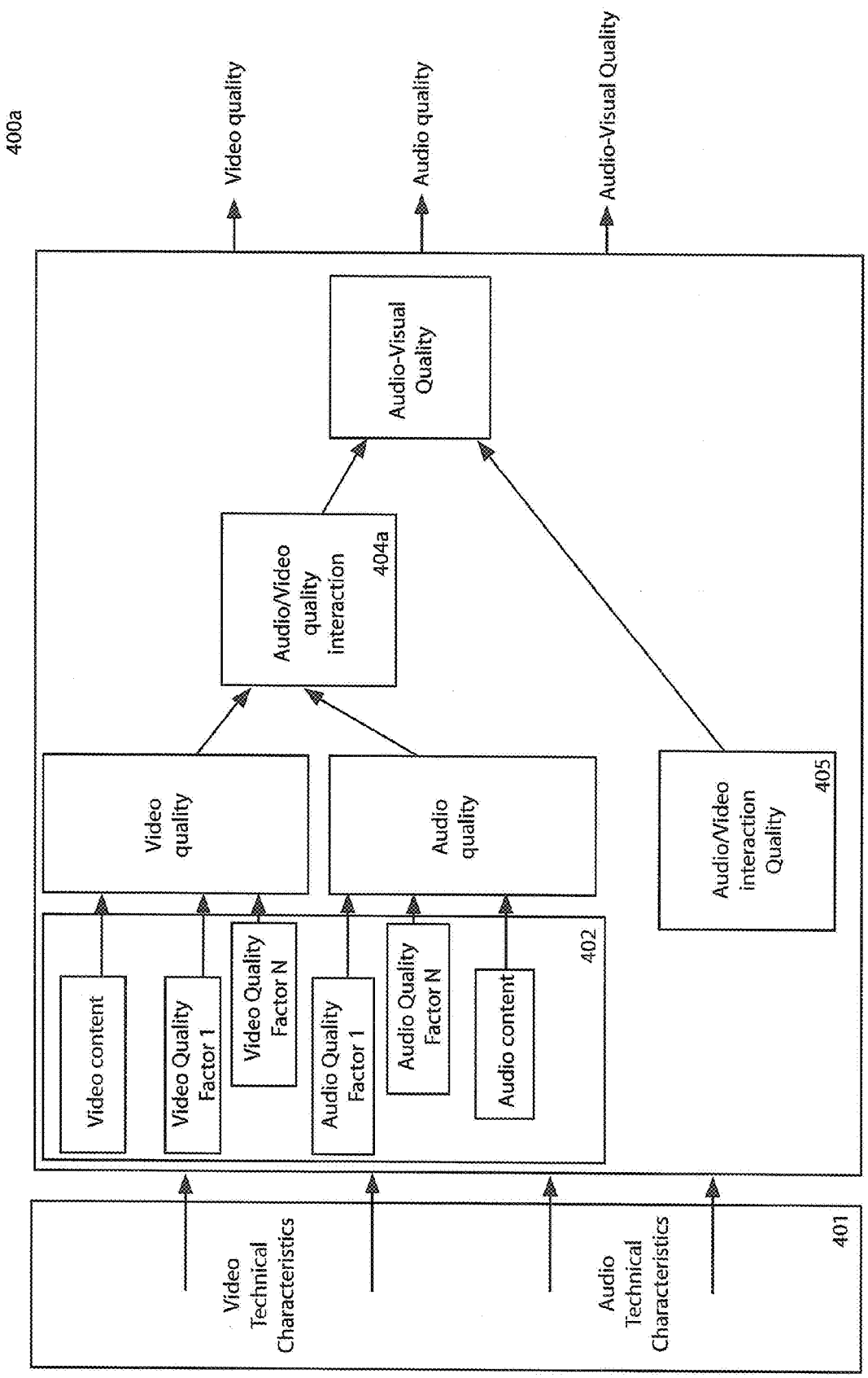
FIG. 4A: Audio-Visual Quality estimation method - Quality based approached

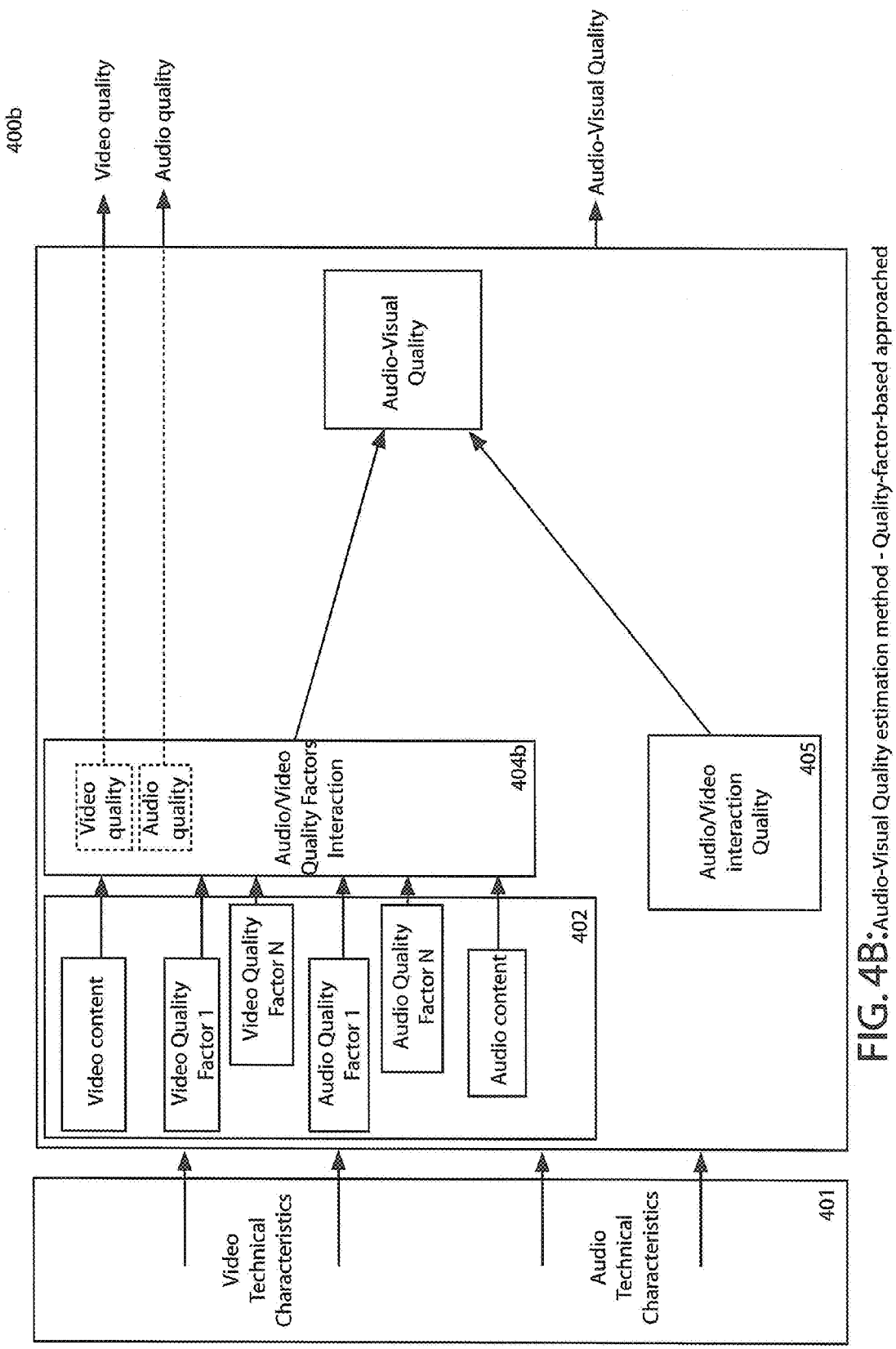
FIG. 4B: Audio-Visual Quality estimation method - Quality-factor-based approached

AUDIO-VISUAL QUALITY ESTIMATION

CROSS REFERENCE TO RELATED APPLICATIONS

Priority is claimed to European Patent Application No. EP 08 15 3548.6, filed Mar. 28, 2008, which is hereby incorporated by reference herein.

FIELD

The invention relates to a method and a measurement system for estimating the quality of a transmitted audio-video signal as perceived by a user of the respective service. In particular, estimates of audio quality, video quality, and audio-visual quality are computed, which provide measures of the perceived multimodal quality of an audio-video signal. The apparatus and the method according to the invention may work without reference to the audio-video signal before transmission. Possible applications are network planning and service monitoring.

BACKGROUND

Network Planning

A proposal for estimating the perceived audio, video and audio-visual quality during network planning is part of the framework of International Telecommunication Union Study Group 12 (ITU SG12 planned recommendations G.OMVAS "Opinion Model for Video and Audio Streaming applications"). Video, audio and audio-visual qualities are predicted based on network assumptions like the chosen codecs, bitrates and expected packet loss rates.

For speech services, the E-Model (ITU-T Rec. G.107, 1995-2005) can be used for estimating the perceived speech quality during network planning. It predicts the perceived speech quality based on the combination of impairments which are the transformation of the technical characteristics of the planned service onto a perceptual scale.

Service Monitoring

Audio-visual quality is commonly computed from the measured audio quality, the measured video quality and their interaction, as described in J. G. Beerends and F. E. Caluwe., "Relations between audio, video and audio-visual quality", 1997, N. Chateau, "Relations between audio, video and audio-visual quality," 1998 or in U.S. Pat. No. 7,197,452. This latter US patent follows a signal-based approach by measuring the audio and video qualities on the audio and video signals themselves. The combination of the video and audio qualities depends on the degree of motion of the video signal. Degradations introduced by the network, like packet losses, and audio-visual synchronization are not considered. U.S. Pat. No. 5,596,364 also provides a method for estimating the perceived audio-visual quality which takes into account the spatial and temporal activities of the video signal, i.e. the amount of details and motion complexity, but requires the transmission of features extracted from the signal before transmission as well as access to the destination signal, i.e. the receiving side, which involves decoding and reconstruction of the signal, which requires high computation power.

Measurement of Video Quality and Audio Quality

Quality measurement systems can be classified as follows:
Full-Reference (FR): the measurement system requires access to a reference signal (source signal, assumed to have perfect quality).
Reduced-Reference (RR): the system has access to partial information extracted from the source signal.
Non-Reference (NR): the reference signal is not available.

A lot of FR and RR systems already exist, e.g., ITU J.144 for video, ITU-T Rec. P.862 "PESQ" for speech. However, for passive service monitoring, NR systems are the only practical choice, since they do not require any reference signal. NR systems can be applied at different points in the network including the client, i.e., at receiving side. For network planning, NR systems are used, since no signals or bit-stream information are available during planning. Especially in the context of data-prone or live-services such as standard definition and high definition television, the additional transmission of the reference signal in real-time is not feasible. Hence, for these services passive monitoring systems including NR quality models may be used.

Most NR systems are signal-based and provide an estimation of the quality as perceived by a human user by analysing the signal itself at the receiving side. Those systems require high computation power, at least for the video signal, since they have to decode and reconstruct the signal. Moreover, they do not take advantage of the analysis of the bit-stream already done by the decoder. These drawbacks can be circumvented with video quality measurement systems estimating the video quality based on a bit-stream analysis, as described in WO-A-2004/054274, which uses information at the video macro-block level.

SUMMARY

An aspect of the present invention is to provide a method and a system for estimating a quality of audio-video signals.

In an embodiment, the present invention provides a method for estimating a quality of an audio-video signal with a computing device. The method includes calculating audio and video quality factors from audio and video technical characteristics. An audio-video quality factors interaction is computed from an interaction between the audio and video quality factors. At least one of an audio quality, a video quality and an audio-visual quality is computed using the audio and video quality factors and the audio-video quality factors interaction.

BRIEF DESCRIPTION OF THE DRAWINGS

An exemplary embodiment of the present invention will be described in more detail below and is schematically shown in the drawings, in which:

FIG. 4a shows a block diagram of the quality based approach; and

FIG. 4b shows a block diagram of the quality-factor-based approach.

DETAILED DESCRIPTION

Figure 1:
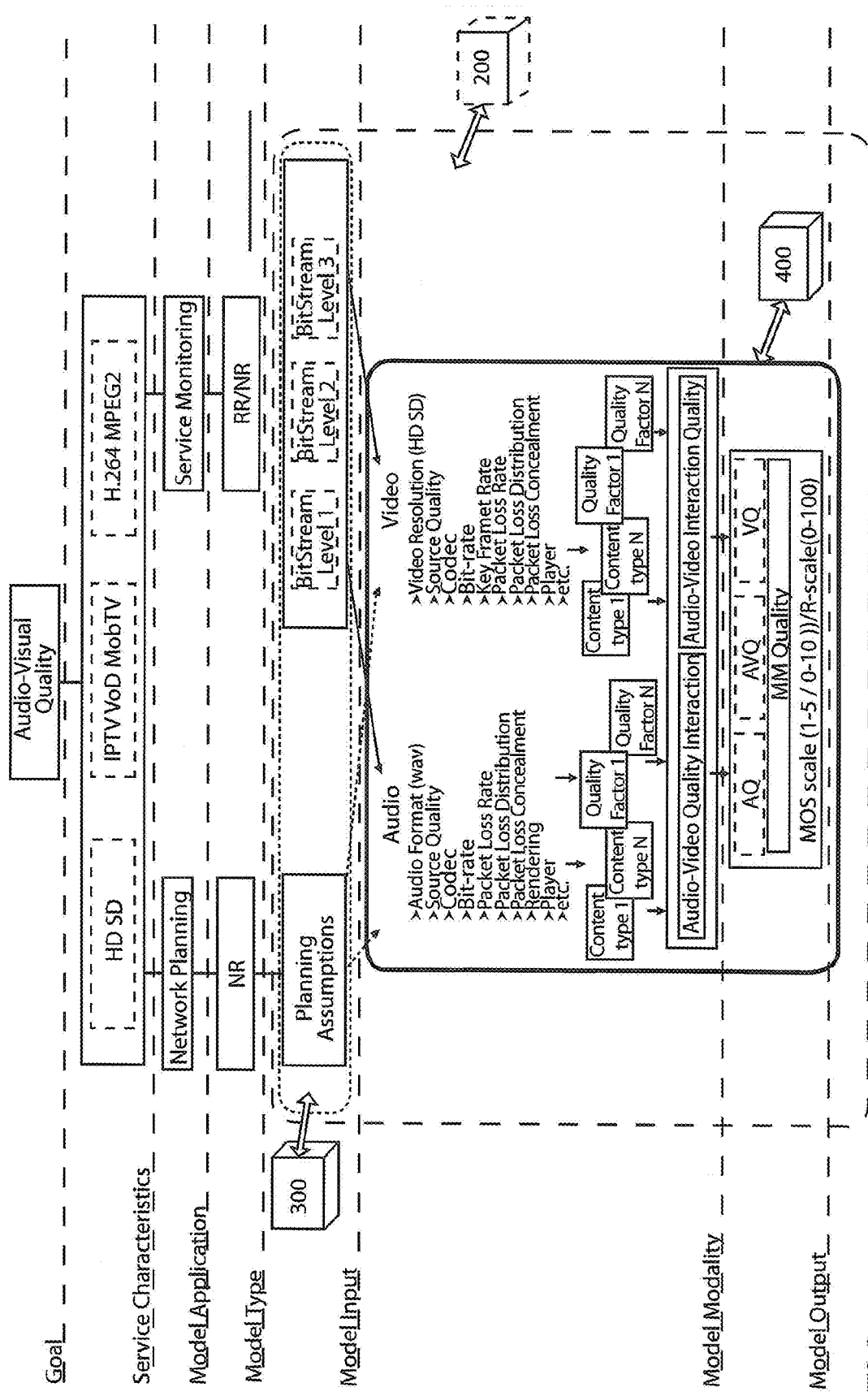
FIG. 1 shows a system overview of the audio-visual quality estimation method and measurement.

An aspect of the present invention allows for evaluating the audio-visual quality of the diverse current and upcoming multimedia applications. Also, an adaptability to new types of degradations introduced by new technologies is possible. Since the impact of the degradations depends on the content types (audio content types: speech, music, etc.; video content: different types characterized by the amount of details, motion complexity, etc.) and on the correlation between the audio and video signals, an aspect of the method and measurement system according to the present invention is taking into account the interaction between degradations and content types. The method and the system can adapt itself to the available data at the receiving side (e.g. encrypted/non-encrypted bit-stream or signal, access/non-access to features extracted from the source signal and sent to the destination, different levels of parsing achieved with a given bit-stream analyser, that is at transport protocol level, at audio- and video-frame-level, and at content-level).

The audio quality, the video quality and/or the audio-visual quality may be calculated from instrumental estimates of different video and audio quality factors. These quality factors quantify the quality impact of different types of technical characteristics. The quality factors are calculated based on a parametric description of the signals and the transmission path. The audio quality, the video quality and/or the audio-visual quality are calculated using a linear combination of the audio- and video-quality factors and their interactions.

Thus, estimates of audio- and video-only quality can be calculated from the audio and video quality factors and their interactions. An alternative less accurate approach for deriving audio-visual quality consists in its direct calculation from the audio and video qualities.

According to an aspect of the invention the technical characteristics are obtained by measuring the technical characteristics from the bit-stream used for transmitting the audio-video signal. The measurement system according to an embodiment of the invention can deliver different levels of information on the technical characteristics of the audio-video signal depending on the depth of analysis of the bit-stream.

According to another aspect of the invention the technical characteristics are put in by a user on the basis of given planning assumptions.

The audio-visual quality measurement method and the system provide estimates of the audio-visual quality of an audio-visual signal, which may be transmitted over packet-based networks and reflect human perception. The audio-visual quality is computed as a function of at least one of various audio and video quality factors (quality-factor-based approach). The audio-visual quality may also be computed as a combination of audio qualities, video qualities and their interaction (quality-based approach), where the individual qualities are calculated based on at least one respective quality factor. The quality-based approach and quality-factor-based approach are described in more detail hereunder.

The quality-factor-based approach is more suitable when some quality factors are predominant and drive the overall audio-visual quality. It also better reflects the human perception and quality judgement process.

The input parameters underlying the audio- and video-quality factors are derived from the technical characteristics of the bit-stream used for transmitting the audio-video signal itself and of the transmission system.

For the quality-factor-based approach, an audio-video quality factors interaction is computed in terms of multiplicative interaction terms of the audio and video quality factors.

According to a further aspect of the invention, an audio-video interaction quality is computed from the respective audio and video technical characteristics to account for problems of audio-video desynchronization. The audio-visual quality is computed from the audio and video quality factors and the audio-video quality factors interaction and optionally further from the audio-video interaction quality.

For the quality-based approach, video quality is computed as a combination of the video quality factors. The audio quality is computed as a combination of the audio quality factors.

For both approaches the audio-visual quality estimation may be based on the analysis of a bit-stream, e.g. by a bit-stream parser, or based on planning assumptions.

FIG. 1 is an overview of the audio-visual quality measurement framework. It includes the considered applications, services, video resolutions, audio formats, video and audio codecs and introduces the method for measuring the audio quality, the video quality and the audio-visual quality for the considered services.

Exemplary service characteristics are high definition (HD) or standard definition (SD) video formats; example applications are IPTV, VoD, Mobile TV; example codecs are H.264, MPEG2. The model input depends on the model application. In the case of network planning, planning assumptions are used as model input. In the case of service monitoring, the output of a bit-stream parser, which may analyze different bit-stream levels, serves as the model input. Depending on the computational resources and encryption of the transmitted data, different bit-stream analysis levels may be accessible for processing audio and video information. As an example, FIG. 1 shows a video input information bit-stream level 3, e.g. macroblock level, and audio input information at bit-stream level 1, e.g. IP packet-header level.

In the context of packet-based non-interactive video services, various degradations occur along the transmission of audio-video signals from the sender to the receiver. For video, degradations are for instance compression, packet loss or discard leading to freezing or slicing, and for audio, examples of degradations are compression, bandpass filtering during transmission or due to the electroacoustic interfaces, and interruptions caused by packet loss or discard.

Video and audio quality factors are due to the technical characteristics of the audio-video transmission path, resulting in degradations of the audio-video signal along its transmission from the sender to the receiver. The technical characteristics that ultimately determine the characteristics of the transmitted audio and video are partly directly specified when designing the video service. Technical characteristics have different effects on perceived quality. Most of the time they are degrading the signal in the present framework. They can also reduce existing degradations (e.g. packet loss can be attenuated by employing measures of error resilience such as packet loss concealment (PLC) in the decoder, where for example missing parts of video frames are replaced with information from previous frames or parts from the current frame). Other types of technical characteristics like video resolution, audio format, display type, video size and audio rendering have also notable impacts at the perceptual level and contribute to the overall perceived quality.

The technical characteristics transformed onto the perceptual domain in terms of their quality impact are referred to as quality factors in the following.

Examples of audio and video quality factors and the underlying technical audio and video characteristics are given in the following table, together with the parameters that can be used to describe the technical audio and video characteristics.

| Technical Video Characteristics/Parameters | | Perceptual effect | Quality Factor $Fv_i$ |
|---|---|---|---|
| Codec | type [flag] bitrate [kbps] | Blockiness/blurriness | Coding Quality Factor Fv_cod |
| Image resolution [flag] | | Impact of size and level of details on perceived quality; visibility of the other degradations; degree of immersion | — (in the model in terms of different model versions) |
| Packet loss | mean percentage Ppl[%] distribution (e.g. number and mean duration of corruption (packet loss) events, overall corruption duration per video sequence, number of Group Of Pictures (GOPs) affected by corruption, corruption weight (e.g. mean corruption weight per GOP, overall corruption weight per video sequence) concealment (PLC) | Freezing, slicing events (depending on PLC) and frequency; distance between loss events; distortion strength per frame (slicing) Freezing of image until next fully received frame available; block artefacts in case of slicing due to erroneous image parts being inserted | Transmission Quality Factor Fv_tra |

| Technical Audio Characteristics/Parameters | | Perceptual Effect | Quality Factor $Fa_i$ |
|---|---|---|---|
| Codec | type bitrate [kbps] | Coloration: linear distortion: brightness non-linear distortion: bubbling | Coding Quality Factor Fa_cod |
| Band width | $z_{bw}$ [bark] fc[Hz] | Frequency content Directness | Bandwidth Quality Factor |
| Packet loss | mean percentage Ppl [%] distribution (s.a.) concealment (PLC) | Continuity (interruptions), artefacts frequency and distance between events | Transmission Quality Factor Fa_tra |

One quality factor can be generated by a combination of different technical characteristics. Perceived quality typically is of multidimensional nature. The perceptual event may be described by different attributes that are related with a set of underlying, orthogonal quality dimensions. Then, the quality related with a given set of technical parameters can be modelled as a linear or non-linear combination of the resulting quality dimensions and values on these dimensions. As a consequence, if the estimated quality is based on the combination of quality factors, the quality can still be estimated even with not-yet considered degradations, as long as those degradations are transformed into an already considered quality factor (for speech cf. Heute, U., Moller, S., Raake, A., Scholz, K., "Waltermann, M., "Integral and Diagnostic Speech—"Quality Measurement: State of the Art, Problems, and New Approaches", in: Proc. 4th European Congress on Acoustics (Forum Acusticum 2005), HU-Budapest, pp. 1695-1700.). This is a crucial point for estimating the quality of new technologies generating new types of degradations (not perceptual quality factors).

Another important point is the influence of the content on the perceived quality. The term "content" here means the temporal and spatial complexity of the video, the type of content of the audio (speech, audio, noise, speech on noise or music) and the correlation between audio and video. Consequently, in the present method, descriptors may be used which provide a measure of the complexity of the video content and the type of audio content. For example, a video descriptor may relate to the number of intracoded frames and/or predicted frames. The impact of the degradations on the overall perceived quality varies as a function of the content, which may be represented by a content descriptor, so that the content can be integrated in the computation of the estimation of the audio, video and audio-visual quality.

Figure 2:
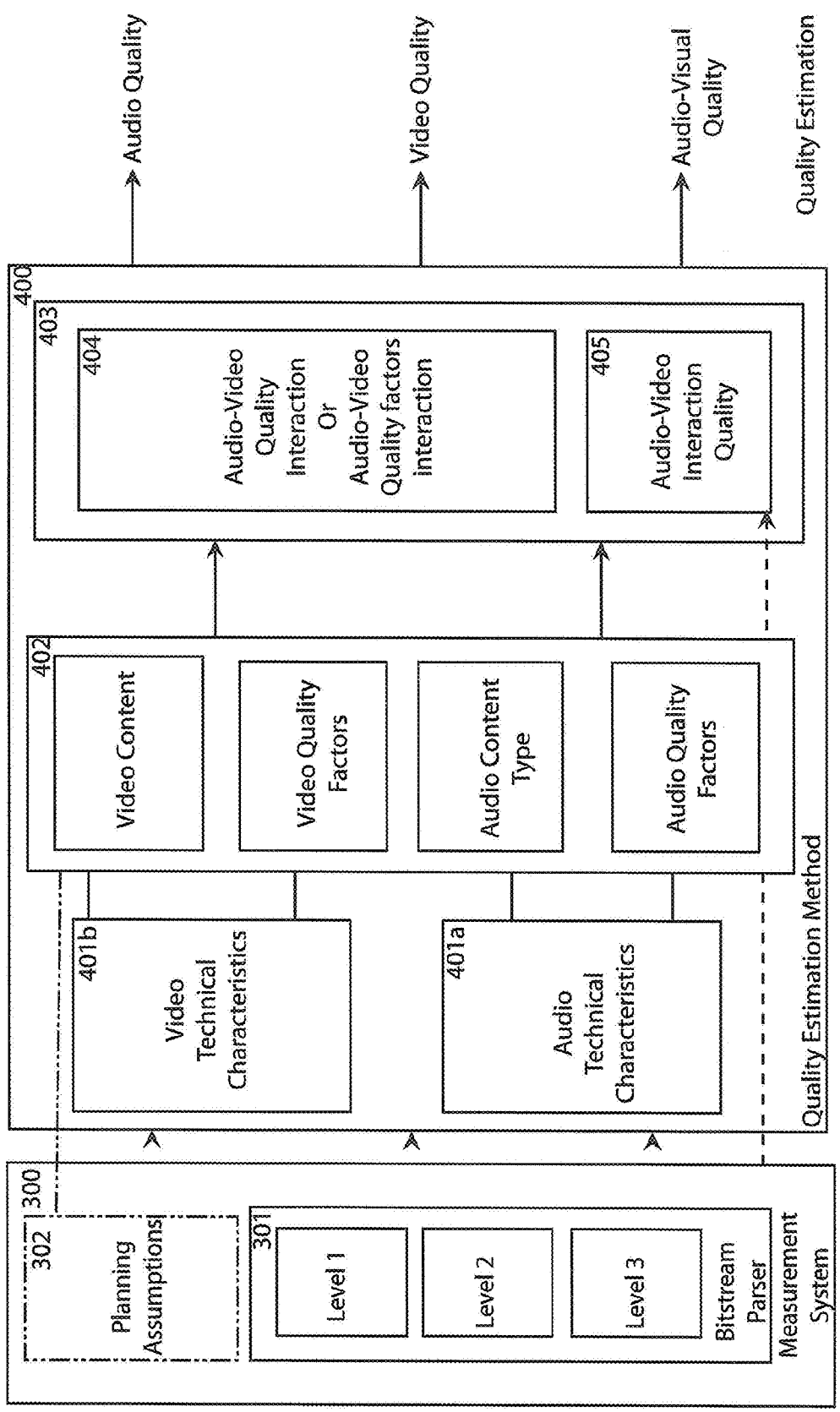
FIG. 2 shows a block diagram of the audio-visual quality estimation method.

These observations lead to the approach shown in FIG. 2, which is an overview of the audio, video and audio-visual quality measurement system and estimation method. It corresponds to block 200 as shown in FIG. 1. Content and quality factors (block 402) are instrumentally derived or calculated from the audio and video technical characteristics (blocks 401a and 401b), which are either obtained from the analysis and measurement of the bit-stream (block 301) or as an input by a user based on given planning assumptions (block 302). It is noted that the term content may also relate to a set of content descriptors. Video quality is estimated using information about the video content (if available) and video quality factors. Audio quality is estimated using information about the audio content (if available) and audio quality factors. Audio-video quality interaction or audio-video quality factors interaction (block 404) are calculated from the video and audio quality factors, which may include the video and audio contents using the respective descriptors. Audio-visual interaction quality (block 405) may be calculated using the results from the bit-stream analysis or put into the model by a user based on network assumptions (block 300). Only if the bit-stream analysis or network assumptions enable indicating the status of the synchronization between audio and video, the synchronization-related audio-visual interaction quality can be obtained. If available, the information about the audio and video contents can be used to more accurately determine the impact of the de-synchronization, if any, on the perceptual quality.

Figure 3:
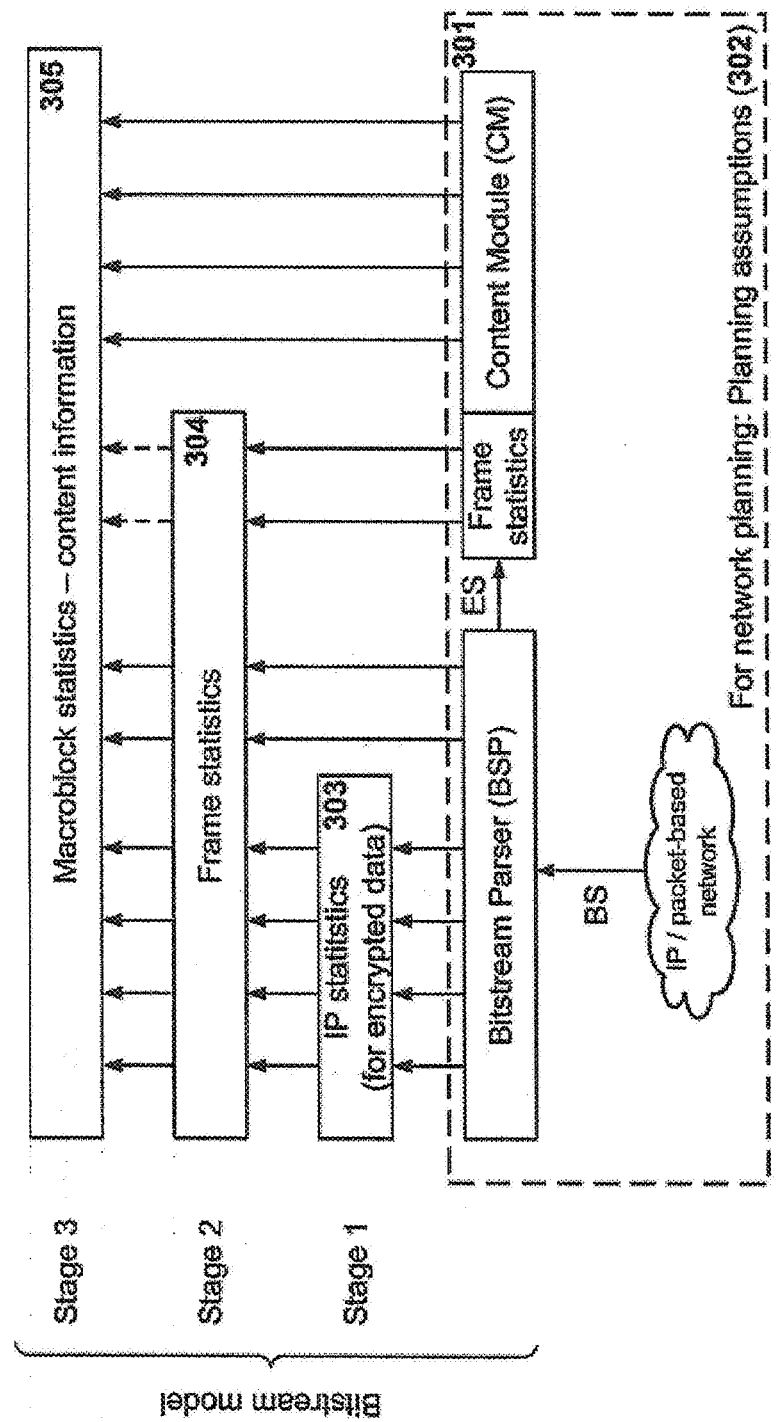
FIG. 3 shows the measurement system and different bit-stream analysis levels.

FIG. 3 shows the measurement of the audio and video qualities based on different levels of analysis (parsing) of the bit-stream. It corresponds to the block 300 of FIG. 1. As already mentioned, the impact of the quality factors on quality depends—besides the technical characteristics—also on the video and audio contents and on the correlation between the audio and the video signal. Information on the content is calculated using the results from the analysis of the bit-stream using a bit-stream parser (block 301). The bit-stream can be analyzed at different levels, depending on the required and available information. These different levels match different steps of parsing the bit-stream. For the video-part, main levels are IP-level (block 303), frame-level (block 304) and macroblock-level (block 305). For instance, in the case of encrypted video data, usually one has access to the transport headers only. At this stage, depending on the encryption-level, it is possible to derive information like the coding bit-rate, the frame-rate, the packet loss rate and the codec type. With non-encrypted data, a deeper parsing of the bit-stream is possible. The bit-stream analyser can access the type of frame (I, P or B frame) so that, for example, the impact and propagation of errors can be predicted. Either the knowledge of the group of picture structure, or a deeper parsing of the bit-stream at the slice and even macroblock level allows information relevant for characterizing the video content to be extracted, i.e. the amount of detail and complexity of motions. Macroblock-level information is, for example, the macroblock type (intra-coded, skipped, etc.), the quantization parameter, the transform coefficients and motion vectors. Group-of-picture related information is, for example, the key-frame-rate, the mean distance between reference-frames (typically referred to as N and M, respectively), and the sizes of the different frames forming a given group of pictures. These parameters can either be obtained from a respective parsing of the bit-stream, or by a statistical evaluation of the packet-sizes together with frame-ending indicators provided in the transport-layer headers.

In the case of network planning, relevant information like bit rate, frame rate, codec, packet loss rate, packet loss concealment, packet loss distribution, content type and synchronization between audio and video are not measured but put into the model by a user based on assumptions for the planned service layout.

Audio-Visual Quality

FIG. 4 describes both the quality-based approach (FIG. 4a) and the quality-factor-based approach (FIG. 4b) for determining the audio-visual quality. It corresponds to the block 400 of FIG. 1.

The audio-visual quality can be estimated based on the audio and video quality factors and their interaction (quality-factor-based approach, described in FIG. 4b). In a simpler, more stepwise approach, audio-visual quality can also be estimated based on the audio quality, the video quality and the interaction between audio and video quality (quality-based approach, described in FIG. 4a), however in the hereby described approach using the respective quality factors underlying the audio- and video-quality.

In both approaches, video and audio contents, which may also be represented by content descriptors, and quality factors (block 402) can be derived from the measured (or planning information about) video and audio technical characteristics (block 401). Video and audio qualities may then be computed from the individual audio and video contents and quality factors (block 402).

In the quality-based approach, the next step is to compute the interaction between the video and audio qualities (block 404a) as well as the quality of the interaction between audio and video, e.g. lip-synchronization (block 405). At last, the audio-visual quality is computed from the audio-visual quality interaction and the quality of the audio-visual interaction Rsync. Hence, audio-visual quality can be expressed as:

$$Rav = a + (bRa + cRv + dRa \cdot Rv) \cdot (1 + k \cdot Rsync) \quad (1)$$

Where Rav, Ra and Rv are respectively the (content-dependent) perceived audio-visual, audio and video quality ratings, and Rsync is the quality of the audio-visual interaction. The coefficients a, b, c, d, k are application-dependent factors that are empirically derived from audio-visual quality perception tests. If the synchronization quality cannot be derived, for example since the audiovisual delay cannot be measured, the factor k can be set to k=0 so that the right-hand term in formula (I) becomes "1". The video-quality and audio-quality Rv and Ra are expressed as functions of the aforementioned video- and audio-quality factors, respectively:

$$Rv = f(Fv) \quad (1)a$$

$$Ra = f(Fa) \quad (1)b$$

The dependency of audio-visual quality on the type of video and audio degradations can be captured by the quality-factor-based approach. Indeed, in this approach, the audio-visual quality is directly computed from the audio and video quality factors (block 402) and their interaction (block 404b). This leads to the following expression of the audio-visual quality:

$$Rav = Rav, o + f(Fv_i) + g(Fa_j) + h(Fv_i \cdot Fa_j) \quad (2a)$$

If in this embodiment the output of the audio-video interaction quality (block 405) is also taken into account, this leads to the following equation of the audio-visual quality:

$$Rav = Rav, o + f(Fv_i) + g(Fa_j) + h(Fv_i \cdot Fa_j) + l(Rsync) + m(Rsync, Fa_j, Fv_i) \quad (2b)$$

Where Rav,o is the quality rating for the source signal (i.e. before any modification occurs), f, g, and h are functions representing the combination of a number i of video quality factors from the set $Fv_i$, a number j of audio quality factors from the set $Fa_j$ and the interaction between video and audio quality factors $Fv_i \cdot Fa_j$. The operator "·" relates to a multiplication. The functions l and m refer to the quality-impact of audiovisual delay and to the interactions with the audio- and video-quality factors.

Video and Audio Qualities

Video and audio qualities Rv and Ra are estimated based on the combination of video and audio quality factors. This is expressed as follow:

$$Rv=Rv,o+fv(Fv_i)$$

$$Ra=Ra,o+fa(Fa_j)$$

Where Rv,o is the video source quality and Ra,o is the audio source quality, and fv and fa are functions of the combination of video quality factors from the set $Fv_i$ and audio quality factors from the set $Fa_j$, respectively.

In the context of Internet Protocol TeleVision (IPTV)

Video and Audio Qualities:

In the context of IPTV, High Definition (HD, 1920×1080 pixels) and Standard Definition (SD, 720×576 pixels) video formats, H.264 and MPEG2 video codecs, and based on the results of subjective video tests, the following video quality formula can be obtained:

$$Rv=Rv\_o+Fv\_res+Fv\_cod+Fv\_tra+Fv\_dis \quad (3)$$

Here, Rv_o is the video source quality, Fv_res is the quality factor describing the impact due to the picture size, Fv_cod is the impairment caused by the video compression, Fv_tra the quality impact due to packet loss and packet loss concealment, and Fv_dis the impact due to the display. Note that the video quality factors Fv_res, Fv_cod, Fv_tra and Fv_dis all pertain to the quality factor set $Fv_i$ from equations (1), (1)a, (1)b and (2a) or (2b). The video quality rating Rv ranges from 0 to 100.

In the context of IPTV, wav audio format, AAC, HEAAC, MP2 and MP3 audio codecs and based on the results of subjective audio tests, the following audio quality formula can be obtained:

$$Ra=Ra\_o+Fa\_cod+Fa\_tra+Fa\_dis \quad (4)$$

Where Ra_o is the audio source quality, Fa_cod is the audio quality factor capturing the audio quality impairment due to audio compression, Fa_tra is the quality impact due to packet loss and packet loss concealment, and Fa_dis the impact due to the audio display. As in case of the video quality factor, the audio quality factors Fa_cod, Fa_tra and Fa_dis are from the set $Fa_j$. The audio quality rating Ra ranges from 0 to 100.

Fx_cod (x=a: audio, x=v: video) is a function of the respective audio and video bit rates, and Fx_tra is a function of the bit-rate and the packet loss rate:

$$Fx\_cod=a1 \cdot \exp(a2 \cdot bitrate)+a3 \quad (5)$$

$$Fx\_tra=(b0-Fx\_cod) \cdot Ppl/(b1+Ppl) \quad (6)$$

Fx_cod and Fx_tra are obtained in a least-square curve fitting procedure using separately the subjective audio- (x=a) and video (x=v) subjective test results.

Coefficients involved in the above equations take different values, depending on the used codec, packet loss concealment, packet loss distribution (e.g. random loss and bursty loss) and content type.

For instance, with HD format, H.264 and MPEG2 codecs, for video the following coefficient value-set was obtained from subjective tests and curve-fitting:

Rv_o+Fv_res+Fv_dis=97.8061 (set fixed for network assessment)

For H264: a1=65.6339; a2=−0.2834; a3=6.0367; In the case of freezing: b0=84.8166; b1=0.1334; In the case of slicing: b0=72.892; b1=c1+c2/bitrate; c1=0.09026; c2=1.384.

For MPEG2: a1=52.0725; a2=0.118; a3=14.8075; In the case of freezing: b0=84.8; b1=0.1334; In the case of slicing: b0=89.6376; b1=c1+c2/bitrate; c1=0.188; c2=2.6;

Using those coefficients in equations (5) and (6), equation (3) leads to a correlation with subjective ratings of ρ=0.981 and a Root Mean Square Error (RMSE) of 4.269 (on the scale from 0-100).

For audio, with the AAC, HEAAC, MPEG -1 Layer 2 (MP2) and MPEG-1 Layer 3 (MP3) audio-codecs, the following coefficient values were obtained based on subjective tests:

Ra_o+Fa_dis=87.85

For AAC: a1=515.6566; a2=−0.0704; a3=0; b0=45; b1=7;
For HEAAC: a1=15.8604; a2=−0.0178; a3=0; b0=58; b1=10;
For MP2: a1=295.062; a2=−0.0259; a3=0; b0=67; b1=2;
For MP3: a1=252.19915; a2=−0.0365; a3=0; b0=74; b1=0.65;

Using those coefficients in equations (5) and (6), equation (4) leads to a correlation with subjective ratings of ρ=0.995 and an RMSE of 1.977 (on the scale from 0-100).

Audio-Visual Quality

In the context of IPTV, and HD video formats, H.264 video codec, wav audio format, AAC audio codec, and applying multiple regression analysis using the results of the audio-only, the video-only, the audio-visual subjective tests and equations (1) and (2), the following audio-visual quality formula was obtained:

Quality-Based Approach:

$$Rav=19.56+0.194 \cdot Rv+0.007 \cdot Ra \cdot Rv \quad (7)$$

which leads to a correlation with the perceived audio-visual quality of ρ=0.9732 and an RMSE of 4.369 (on the scale from 0-100). The audio- and the video-quality is estimated using the quality-factor based approach for the individual modalities.

Quality-factor-based approach:

Alternative a)

$$Rav=87.75+0.623 \cdot Fv\_cod+0.323 \cdot Fa\_tra+0.615 \cdot Fv\_tra-0.002 \cdot Fa\_cod \cdot Fv\_cod-0.005 \cdot Fa\_cod \cdot Fv\_tra \quad (8a)$$

which leads to a correlation with the perceived audio-visual quality of 0.96 and an RMSE equal to 4.74 (on the scale from 0-100).

Alternative b)

$$Rav=88.195-0.379 \cdot Fa\_cod-0.588 \cdot Fv\_cod-0.625 \cdot Fa\_tra-0.625 \cdot Fv\_tra+0.005 \cdot Fa\_cod \cdot Fv\_cod+0.007 \cdot Fa\_tra \cdot Fv\_tra+0.011 \cdot Fv\_cod \cdot Fa\_tra+0.007 \cdot Fa\_cod \cdot Fv\_tra \quad (8b)$$

which leads to a correlation with the perceived audiovisual quality of 0.98 and an RMSE equal to 2.56 (on the scale from 0-100).

Conversion into 5-point Mean Opinion Score (MOS) Scale and 11-Point MOS Scale:

Audio, video and audio-visual qualities are computed using a "psychological" scale, ranging from 0 to 100, on which the quality factors are supposed to be additive.

For comparison with results of other audio-visual quality measurement systems or subjective tests, it might be useful to convert values on the 0-100 scale into values on the more common 5-point (ITU-T P.800) and 11-point (ITU-T P.910) MOS scales.

Conversion from the 0-100 scale to the 5-point MOS scale is described in Annex B of the E-Model (ITU-T Rec. G.107, 2007).

Conversion from the 5-point MOS scale (MOS_5) to the 11-point MOS scale (MOS_11) is computed as follows:

$$MOS\_11 = (MOS\_5 - 1) \cdot 10/4$$

To best match the provided coefficients to a given application, it may be desirable to modify the proposed default-settings based on dedicated subjective tests. These tests should be carried out following respective recommendations that employ scales that can be converted to the model scale, e.g. for audio ITU-T Rec. P.800 (1996), and for video ITU-T Rec. P. 910 (1999). After conversion of the test results to the model scale, coefficients can be determined based on a multiple regression that fits the model predictions to the transformed subjective test results, using the technical characteristics used in the test as variables, and the required coefficients as free parameters.

While certain embodiments have been chosen to illustrate the invention it will be understood by those skilled in the art that changes and modifications can be made therein without departing from the scope of the invention as defined in the appended claims.

The invention claimed is:

1. A method for estimating a quality of an audio-video signal with a computing device, the method comprising the following steps:
   determining, by the computing device, audio and video technical characteristics of the audio-video signal, wherein the audio and video technical characteristics include parameters relating to packet loss and coding;
   quantifying, by the computing device, a quality impact of subsets of the audio and video technical characteristics, wherein the quantified quality impacts of different subsets of the audio and video technical characteristics are represented by multiple audio quality factors and multiple video quality factors;
   based on the multiple audio quality factors and the multiple video quality factors, determining, by the computing device, an audio-video quality factors interaction from an interaction between the multiple audio and multiple video quality factors; and
   outputting, by the computing device, an overall audio-visual quality estimate corresponding to the audio-video signal based on combining the multiple audio and multiple video quality factors and the audio-video quality factors interaction.

2. The method according to claim 1, wherein determining the audio and video technical characteristics is performed by at least one of measuring a bit-steam of the audio-video signal and receiving user input of the audio and video technical characteristics based on planning assumptions.

3. The method according to claim 1, further comprising:
   determining audio and video content descriptors;
   wherein at least one of the determining the audio and video content descriptors and the determining the audio and video technical characteristics is performed based on a bit-stream analysis.

4. The method according to claim 3, wherein the bit-stream analysis includes an analysis at different levels of the bit-stream.

5. The method according to claim 3, wherein the bit-stream analysis includes an analysis at at least one of an IP-level, a frame-level and a macroblock-level.

6. The method according to claim 1, wherein the multiple audio and multiple video quality factors include at least one of a coding quality and a transmission quality factor.

7. The method according to claim 3, wherein the video content descriptors designate spatial and temporal complexity.

8. The method according to claim 3, wherein the audio content descriptors designate a type of content, and wherein the type of content is at least one of speech and music.

9. The method according to claim 3, wherein the audio and video content descriptors designate a temporal correlation.

10. The method according to claim 1, further comprising the step of transmitting the audio-video signal over a packet-based network.

11. The method according to claim 1, further comprising the steps of:
    transmitting the audio-video signal, and
    analyzing a bit-stream thereof with reference to the audio-video signal before the transmission.

12. A non-transitory computer-readable medium, having computer-executable instructions stored thereon for estimating a quality of an audio-video signal, the computer-executable instructions, when executed by a processor, causing the following steps to be performed:
    determining audio and video technical characteristics of the audio-video signal, wherein the audio and video technical characteristics include parameters relating to packet loss and coding;
    quantifying a quality impact of subsets of the audio and video technical characteristics, wherein the quantified quality impacts of different subsets of the audio and video technical characteristics are represented by multiple audio quality factors and multiple video quality factors;
    based on the multiple audio quality factors and the multiple video quality factors, determining an audio-video quality factors interaction from an interaction between the multiple audio and multiple video quality factors; and
    outputting an overall audio-visual quality estimate corresponding to the audio-video signal based on combining the multiple audio and multiple video quality factors and the audio-video quality factors interaction.

13. The non-transitory computer-readable medium according to claim 12, wherein the audio and video technical characteristics are determined by measuring a bit-stream of the audio-video signal.

14. The non-transitory computer-readable medium according to claim 13, wherein measuring the bit-stream includes obtaining different levels of information on the audio and video technical characteristics of the audio-video signal.

15. The non-transitory computer-readable medium according to claim 12, wherein the audio and video technical characteristics are determined by receiving input of the audio and video technical characteristics from a user based on assumptions for a planned service layout.

* * * * *